United States Patent
Suzuki et al.

(10) Patent No.: US 11,578,972 B2
(45) Date of Patent: Feb. 14, 2023

(54) TIRE-SIDE DEVICE AND TIRE APPARATUS INCLUDING THE SAME

(71) Applicant: DENSO CORPORATION, Kariya (JP)

(72) Inventors: Yoichiro Suzuki, Nisshin (JP); Takatoshi Sekizawa, Kariya (JP); Masashi Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 20 days.

(21) Appl. No.: 16/660,781

(22) Filed: Oct. 22, 2019

(65) Prior Publication Data

US 2020/0049497 A1 Feb. 13, 2020

Related U.S. Application Data

(63) Continuation of application No. PCT/JP2018/017069, filed on Apr. 26, 2018.

(30) Foreign Application Priority Data

Apr. 26, 2017 (JP) ............................. JP2017-087554

(51) Int. Cl.
  *G01P 15/00* (2006.01)
  *G01B 17/08* (2006.01)
  *G06K 9/00* (2022.01)
  *B60C 19/00* (2006.01)

(52) U.S. Cl.
  CPC .............. *G01B 17/08* (2013.01); *G01P 15/00* (2013.01); *G06K 9/0053* (2013.01); *G06K 9/00536* (2013.01); *B60C 19/00* (2013.01); *B60C 2019/004* (2013.01)

(58) Field of Classification Search
  CPC .. G01B 17/08; G06K 9/0053; G06K 9/00536; G06K 9/6269; B60C 1/00; B60C 19/00; B60C 2019/004; B60W 2552/00; B60W 40/06; B60W 50/14; G01P 15/00
  USPC .......... 73/146; 324/126; 701/36; 702/41–42, 702/138–140, 167, 189
  See application file for complete search history.

(56) References Cited

U.S. PATENT DOCUMENTS

| 6,668,637 B2* | 12/2003 | Ono ...................... B60C 23/061 152/415 |
| 6,754,615 B1* | 6/2004 | Germann ................ G06F 30/23 703/8 |
| 9,610,476 B1* | 4/2017 | Tran ................... A63B 24/0021 |
| 9,849,364 B2* | 12/2017 | Tran ....................... G16H 50/30 |

(Continued)

FOREIGN PATENT DOCUMENTS

JP 2016-107833 A 6/2016

OTHER PUBLICATIONS

U.S. Appl. No. 16/859,799, filed Apr. 27, 2020, Sekizawa.

*Primary Examiner* — Jeffrey P Aiello
(74) *Attorney, Agent, or Firm* — Harness, Dickey & Pierce, P.L.C.

(57) ABSTRACT

A tire-side device is attached to a tire included in a vehicle and applied to a tire apparatus for estimating a condition of a road surface on which the vehicle travels. The tire-side device includes: a vibration detector outputting a detection signal according to a level of vibration of the tire; a controller having a feature quantity extraction device extracting a feature quantity of the detection signal in one rotation of the tire; and a transmitter transmitting road surface data including the feature quantity extracted by the feature quantity extraction device.

5 Claims, 6 Drawing Sheets

(56) References Cited

U.S. PATENT DOCUMENTS

| | | | | |
|---|---|---|---|---|
| 2004/0015312 A1* | 1/2004 | Asano | B60C 23/061 | |
| | | | | 702/113 |
| 2004/0138831 A1* | 7/2004 | Watanabe | B60T 8/1725 | |
| | | | | 702/33 |
| 2005/0085969 A1* | 4/2005 | Kim | B60G 17/0152 | |
| | | | | 701/37 |
| 2007/0233352 A1* | 10/2007 | Miyashita | G01M 17/022 | |
| | | | | 701/82 |
| 2008/0086260 A1* | 4/2008 | Lee | G01C 21/3608 | |
| | | | | 701/532 |
| 2008/0245456 A1* | 10/2008 | Spetler | B60T 8/1725 | |
| | | | | 152/209.1 |
| 2013/0116972 A1* | 5/2013 | Hanatsuka | G01B 17/08 | |
| | | | | 702/167 |
| 2016/0368502 A1* | 12/2016 | Suzuki | G01M 17/025 | |
| 2017/0050478 A1* | 2/2017 | Ijima | B60C 23/04 | |
| 2017/0297580 A1* | 10/2017 | Hanatsuka | G08G 1/0141 | |
| 2017/0305421 A1* | 10/2017 | Sekizawa | B60W 40/068 | |
| 2018/0118209 A1* | 5/2018 | Suzuki | B60W 40/068 | |
| 2018/0264894 A1* | 9/2018 | Goto | B60T 8/172 | |
| 2020/0256672 A1 | 8/2020 | Sekizawa | | |

* cited by examiner

GROUND-CONTACTING SURFACE

TIRE-SIDE DEVICE AND TIRE APPARATUS INCLUDING THE SAME

CROSS REFERENCE TO RELATED APPLICATION

The present application is a continuation application of International Patent Application No. PCT/JP2018/017069 filed on Apr. 26, 2018, which designated the U.S. and claims the benefit of priority from Japanese Patent Application No. 2017-087554 filed on Apr. 26, 2017. The entire disclosures of all of the above applications are incorporated herein by reference.

TECHNICAL FIELD

The present disclosure relates to a tire-side device and a tire apparatus.

BACKGROUND

A rear surface of a tire tread may include an acceleration sensor, and the acceleration sensor detects vibration of a tire. A road surface condition determination method may be applied for estimating a road surface condition based on a detection result of the vibration.

SUMMARY

The present disclosure describes a tire-side device and a tire apparatus. The tire-side device detects vibration of a tire and creates road surface data indicative of a road surface condition based on the vibration data, and then transmits the road surface data to a vehicle body side system. The tire apparatus estimates a road surface condition based on the road surface data.

DETAILED DESCRIPTION

Figure 1:
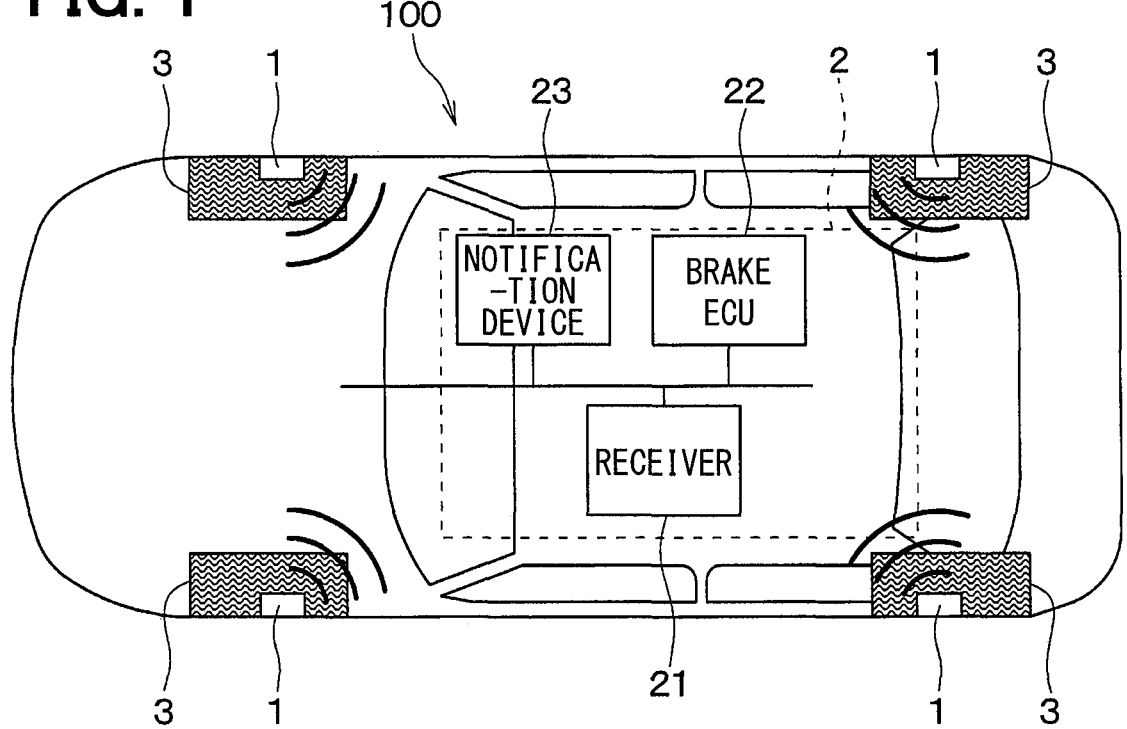
FIG. 1 is a view showing a block configuration of a tire apparatus, to which a tire-side device according to a first embodiment is applied, under a state mounted to a vehicle.

In a road surface condition determination method, a road surface condition is determined by extracting a feature vector from a tire's vibration waveform detected by an acceleration sensor and calculating the degree of similarity between the extracted feature vector and all of stored support vectors for classifying road surface type. For example, the degree of similarity between the extracted feature vector and all of the support vectors is calculated by using a kernel function, and the road surface type, such as a dry road surface or a wet road surface, having the highest degree of similarity is determined as a present road surface. It may be possible to execute such a road surface condition determination method for road surface determination with high robustness.

With regard to the road surface condition determination method described above, it is not certain whether the calculation of the degree of similarity is executed by a controller in a tire or in a vehicle body side system. Since the load of calculating the degree of similarity is heavy, the following situation may occur.

For example, the controller in the tire calculates the degree of similarity and determines the road surface condition. In a situation where a determination result is transmitted to the vehicle body side system, it is necessary to store the support vector in the controller included in the tire and executes data processing of calculating the degree of similarity. Thus, in the tire, the amount of power consumption enormously increases, and the amount of memory consumption for an enormous data storage and data processing also enormously increases.

In addition, the controller included in the tire only extracts the feature vectors, and transmits the data to the vehicle body side system. The vehicle body side system calculates the degree of similarity against all of the support vectors to determine the road surface condition. In this situation, since the timing of data transmission cannot be determined, communication frequency has to be increased. Hence, high-frequency data transmission increases the amount of power consumption.

In one or more embodiments of the present disclosure, a tire-side device is provided for saving memory and power of a controller in a tire, and a tire apparatus includes the tire-side device.

A tire-side device according to an aspect of the present disclosure includes: a vibration detector that outputs a detection signal according to a level of a vibration of a tire; a controller that includes a feature quantity extraction device for extracting a feature quantity of the detection signal in one rotation of the tire; and a transmitter that transmits road surface data including the feature quantity extracted by the feature quantity extraction device. The feature quantity extracted by the feature quantity extraction device at a past rotation of the tire is a past feature quantity, and the feature quantity extracted by the feature quantity extraction device at a present rotation of the tire is a present feature quantity. The controller further includes: a feature quantity storage configured to store the past feature quantity; a variation determination device configured to determine a variation in the condition of the road surface, based on the past feature quantity and the present feature quantity; and a transmission controller configured to control transmission of the road surface data and cause the transmitter to transmit the road surface data including the present feature quantity in response to that the variation determination device determines that the variation occurs in the condition of the road surface.

The variation determination device determines a variation in the road surface condition based on a present feature quantity and a past feature quantity, and transmits the road surface data having the present feature quantity in a situation where the variation determination device determines that there is a variation in the road surface condition. Therefore, it is possible to lower the communication frequency and achieve in saving power consumption in the controller included in the tire. Since it is not necessary for the controller in the tire-side device to include a support vector storage for storing the support vectors, it is also possible to achieve saving memory in the controller included in the tire. Reference numerals with parentheses attached to the respective constituent elements and the like indicate an example of a correspondence relationship between the constituent elements and the like and specific constituent elements and the like described in the embodiment described later.

Embodiments of the present disclosure will be described below with reference to the drawings. In the following respective embodiments, parts identical with or equivalent to each other are denoted by the same symbols for description.

First Embodiment

The following describes a tire apparatus 100 including a road surface condition estimation function according to the present embodiment with reference to FIGS. 1 to 8. The tire apparatus 100 according to the present embodiment estimates a road surface condition during travelling of a vehicle based on vibration applied on a ground-contacting surface of a tire included in each of wheels of the vehicle.

Figure 2:
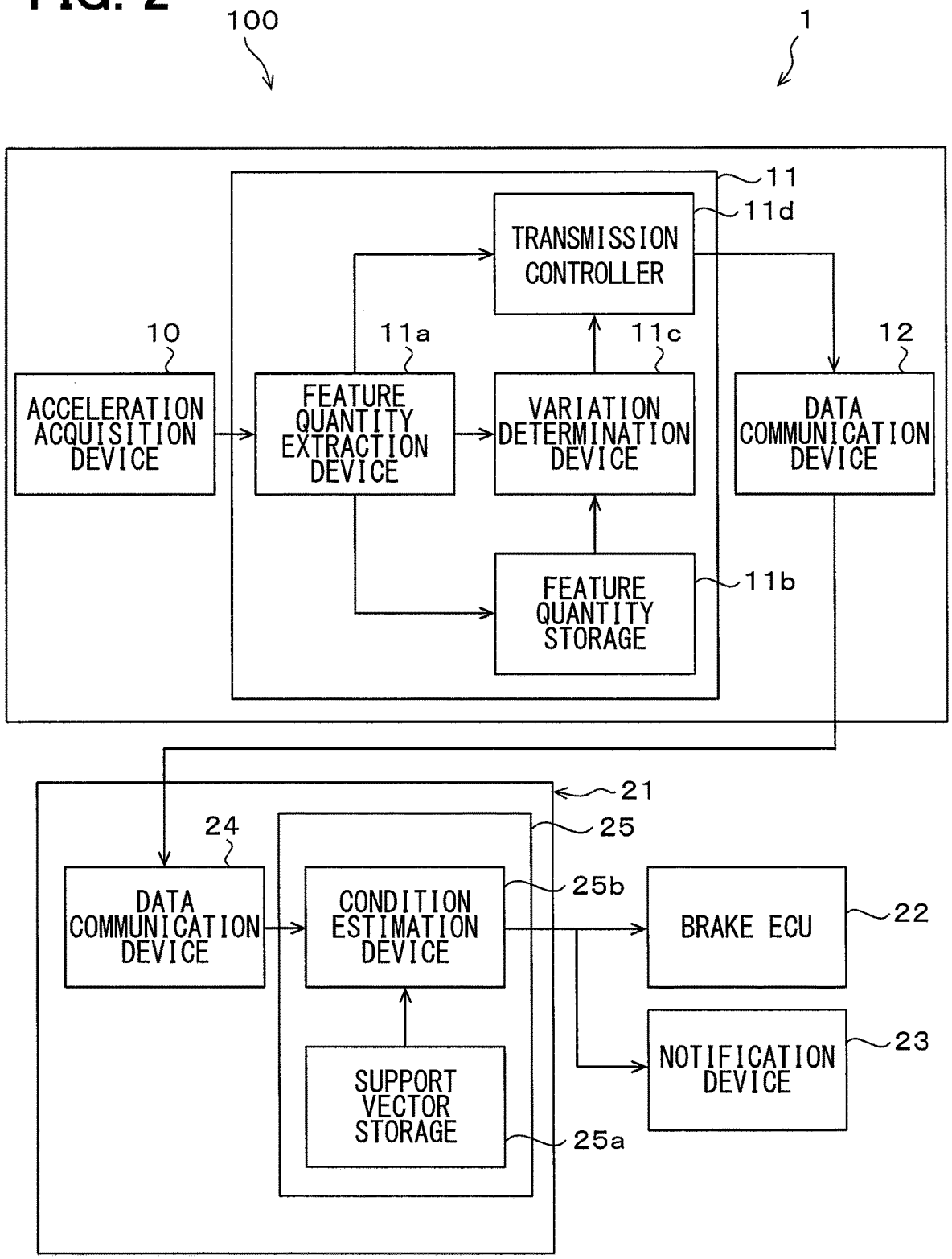
FIG. 2 is a block diagram that shows the details of the tire-side device and a vehicle body side system.
Figure 3:
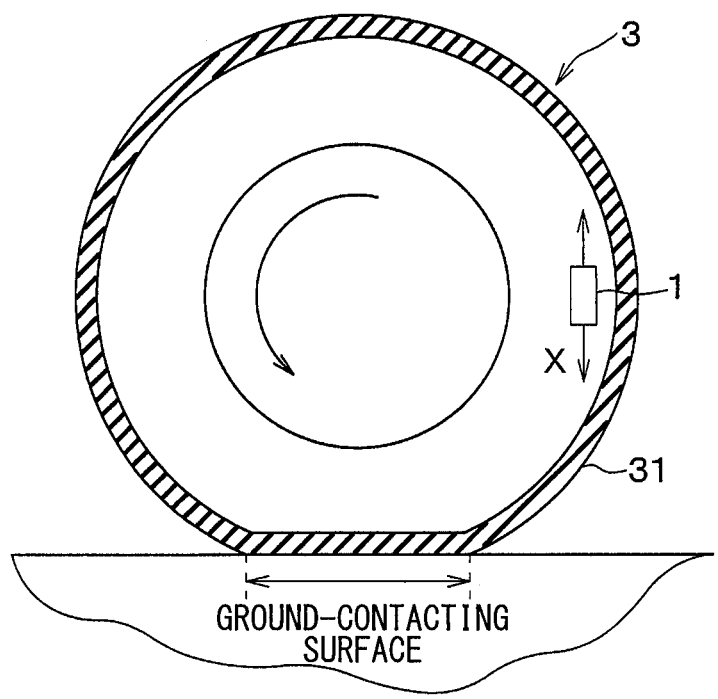
FIG. 3 is a cross-sectional schematic view of a tire to which a tire-side device is attached.

The tire apparatus 100 shown in FIGS. 1 and 2 includes a tire-side device 1 disposed at a wheel, and a vehicle body side system 2 including a variety of devices included in the vehicle. The vehicle body side system 2 includes, for example, a receiver 21, an electronic control device for brake control 22 (hereinafter referred to as a "brake ECU"), and a notification device 23.

The tire apparatus 100 according to the present embodiment transmits, from the tire-side device 1, data according to a road surface condition (hereinafter referred to as "road surface data") during which the tire 3 is travelling. The tire apparatus 100 receives the road surface data by the receiver 21 to estimate the road surface condition. The tire apparatus 100 transmits an estimation result of the road surface condition at the receiver 21 to the notification device 23, and then notify of the estimation result of the road surface condition through the notification device 23. Thus, it is possible to notify the driver of the road surface condition, for example, that the road surface is dry, wet or frozen. It is also possible to warn the driver if the road surface is a slippery. The tire apparatus 100 transmits a road surface condition to the brake ECU 22 or the like for executing vehicle motion control, so that the vehicle motion control for avoiding an undesirable situation can be executed. For example, when the road surface is frozen, a braking force generated with respect to the amount of brake operation is weakened as compared with a situation of the dry road surface. Thus, the vehicle motion control corresponding to a situation where the road surface p is lower can be achieved. The tire-side device 1 and the receiver 21 are configured as follows.

As shown in FIG. 2, the tire-side device 1 includes an acceleration acquisition device 10, a controller 11 and a data communication device 12. As shown in the drawing, the tire-side device 1 is disposed at a rear surface of a tread 31 of the tire 3.

The acceleration acquisition device 10 includes a vibration detector for detecting vibration applied to the tire 3. For example, the acceleration acquisition device 10 is configured by an acceleration sensor. In a situation where the acceleration acquisition device 10 is the acceleration sensor, the acceleration acquisition device 10 outputs a detection signal of acceleration, as the detection signal according to vibration in a direction in contact with a circular orbit drawn by the tire-side device 1 during the rotation of the tire 3. In other words, the acceleration acquisition device 10 outputs the detection signal of acceleration as the detection signal according to vibration in a direction of the tire's tangential direction indicated by an arrow X in FIG. 3.

The controller 11 corresponds to a first controller, and is configured by a microcontroller having, for example, a CPU, a ROM, a RAM, an I/O. The controller 11 is a device for executing the above-mentioned processes according to a program stored in the ROM or the like. The controller 11 includes a feature quantity extraction device 11a, a feature quantity storage 11b, a variation determination device 11c and a transmission controller 11d, which are configured as functional devices for executing the above-mentioned processes.

The feature quantity extraction device 11a uses the detection signal output by the acceleration acquisition device 10 as the detection signal indicating vibration data in the tire's tangential direction to process the detection signal for extracting the feature quantity of tire vibration. In the present embodiment, the detection signal of the acceleration of the tire 3 (hereinafter referred to as a "tire G") is processed by signal processing in order to extract the feature quantity of the tire G. The feature quantity extraction device 11a transmits data having the extracted feature quantity, as the road surface data, to the data communication device 12 through the transmission controller 11d. The details of the feature quantity will be described.

The feature quantity storage 11b stores a feature quantity extracted by the feature quantity extraction device 11a before the tire 3 performs one rotation (hereinafter referred to as a "previous feature quantity"). Since one rotation of the tire 3 can be confirmed by a method described hereinafter, the feature quantity in one rotation unit is stored every time the tire 3 makes one rotation. About the feature quantity in one rotation unit of the tire 3, data may be updated every time the tire 3 makes one rotation. Alternatively, plural rotation units of data are stocked, and the oldest data may be erased every time the tire 3 makes one rotation. In consideration of saving memory space of the controller 11 in the tire 3, it may be preferable to lower the stocked data amount. Thus, it may be preferable to update data every time the tire 3 performs one rotation.

The variation determination device 11c determinates whether there is a variation in the road surface condition, based on the feature quantity extracted by the feature quantity extraction device 11a at the present rotation of the tire 3 (hereinafter referred to as a "present feature quantity") and the previous feature quantity of the tire 3 stored in the feature quantity storage 11b. When the variation determination device 11c determines that there is a variation in the road surface condition, the variation determination device 11c transmits to the transmission controller 11d, a control signal indicative of the variation.

The transmission controller 11d controls data transmission from the data communication device 12. The transmission controller 11d receives from the variation determination device 11c, the control signal indicative of having a variation in the road surface condition, and then the transmission controller 11d transmits to the data communication device 12, road surface data including the present feature quantity extracted by the feature quantity extraction device 11a at that time.

The data communication device 12 includes a transmitter. For example, when the data communication device 12 receives the road surface data from the transmission controller 11d, the data communication device 12 executes transmission of the road surface data including the present feature quantity at that timing. About the timing of data transmission from the data communication device 12, the timing is controlled by the transmission controller 11d. Thus, data transmission is not executed every time the tire 3 performs one rotation, but the data transmission is executed only when there is a variation in the road surface condition.

The receiver 21 includes a data communication device 24 and a controller 25 as shown in FIG. 2.

The data communication device 24 includes a receiving device. The data communication device 24 receives the road surface data including the present feature quantity transmitted from the data communication device 12 in the tire-side device 1, and transmits the road surface data to the controller 25.

The controller 25 corresponds to a second controller. The controller 25 is provided by a microcontroller including a CPU, a ROM, a RAM, an I/O or the like, and executes a variety of processes for detecting the road surface condition based on a program stored in the ROM or the like. The controller 25 includes a support vector storage 25a and a condition estimation device 25b as functional devices for executing a variety of processes.

The support vector storage 25a stores a support vector for classifying road surface type. The support vector is a model feature quantity that is obtained by learning with the use of, for example, a support vector machine. A vehicle having the tire-side device 1 is experimentally run on different types of road surface, and the feature quantity extracted by the feature extraction device 11a in a predetermined number of the tire rotation is learned. The support vector is a part which is obtained by extracting a typical feature quantity from the learned quantity in a predetermined number of pieces. For example, the feature quantity in a million rotation units is learned in each road surface type, the part obtained by extracting a typical feature quantity in a million rotation units from the learned quantity is configured as the support vector.

The condition estimation device 25b compares the present feature quantity, which is received by the data communication device 24 from the tire-side device 1, with a support vector for classifying the road surface type stored in the support vector storage 25a, and estimates the road surface condition. For example, the present feature quantity is compared with the support vector for classifying the road surface type, and the road surface, which corresponds to the support vector having the closest similarity to the present feature quantity, is estimated as the present traveling road surface.

When the controller 25 estimates the road surface condition, the controller 25 transmits the estimated road surface condition to the notification device 23, and notifies a driver of the road surface condition, if necessary, through the notification device 23. The driver tries to drive the vehicle in a manner matching the road surface condition, and thus it is possible to avoid potential undesirable situation to the vehicle. For example, the estimated road surface condition may be always displayed by the notification device 23 or the road surface condition may be displayed to warn the driver only when the vehicle need be driven more carefully than usual, for example, when the estimated road surface condition corresponds to the wet road or the frozen road. Furthermore, when the transceiver 21 transmits the road surface condition to an ECU for vehicle motion control such as the brake ECU 22, the vehicle motion control can be executed based on the transmitted road surface condition.

The brake ECU 22 includes a brake control device that executes various brake controls. In particular, the brake ECU 22 increases or decreases a wheel cylinder pressure by driving a brake fluid pressure control actuator, in order to control a brake force. In addition, the brake ECU 22 can independently control the braking force of each wheel. When the road surface condition is transmitted from the receiver 21 through the brake ECU 22, the control of braking force as the vehicle motion control is executed based on the road surface condition. For example, when the brake ECU 22 indicates that the transmitted road surface is a frozen road, the brake ECU 22 weakens the braking force generated with respect to the amount of brake operation performed by the driver as compared with a situation of the dry road surface. Therefore, it is possible to inhibit wheel slip and avoid potential undesirable situation to the vehicle.

The notification device 23 is configured with a meter display device as an example and used to notify the driver of the road surface condition. In case that the notification device 23 is configured with the meter display device, it is located at a position which the driver is capable of recognition during driving of the vehicle, for example, within an instrument panel in the vehicle. When the road surface condition is transmitted from the transceiver 21, the meter display device visually notifies the driver of the road surface condition by performing display in such a manner that the condition of the road surface can be interpreted.

The notification device 23 can also be configured with, for example, a buzzer or a voice guidance device. In such a case, the notification device 23 notifies the driver of the road surface condition audibly by buzzer sound or voice guidance. Although the meter display device has been exemplified as the notification device 23 providing visual notification, the notification device 23 may be configured with a display device that displays information such as a head-up display.

The tire apparatus 100 according to the present embodiment is configured as described above. Each device forming the vehicle body side system 2 is connected through an in-vehicle LAN (Local Area Network) like CAN (Controller Area Network) communication. Therefore, each device can communicate information with each other through the in-vehicle LAN.

The following describes the details of the feature quantity extracted by the feature quantity extraction device 11a and the determination of a variation in the road surface condition through the variation determination device 11c.

First, the feature quantity extracted by the feature quantity extraction device 11a will be described. The feature quantity is a quantity that indicates the feature of vibration applied to the tire 3. The feature quantity is acquired by the acceleration acquisition device 10.

Figure 4:
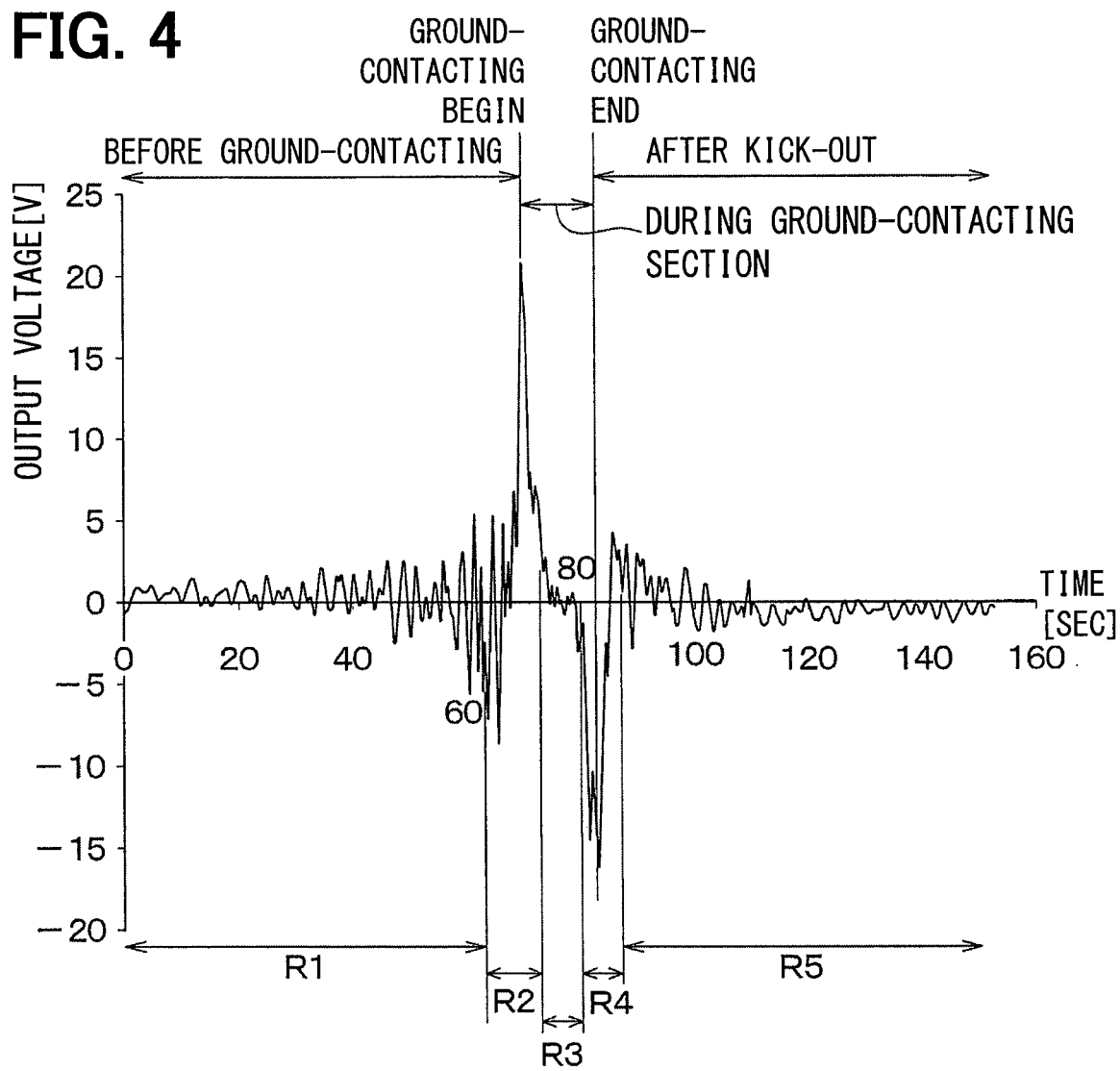
FIG. 4 is a diagram showing an output voltage waveform of an acceleration acquisition device during tire rotation.

The output voltage waveform of a detection signal in the acceleration acquisition device 10 during the tire rotation is, for example, a waveform shown in FIG. 4. As shown in the drawing, the output voltage of the acceleration acquisition device 10 has a maximum value at the contact beginning time when the portion of the tread 31 of the tire 3 corresponding to the position of the acceleration acquisition device 10 begins to contact the ground with the rotation of the tire 3. Hereinafter, a peak value at the beginning of contacting the ground, where the output voltage of the acceleration acquisition device 10 has the maximum value, is referred to as a first peak value. As shown in FIG. 4, the output voltage of the acceleration acquisition device 10 has a minimum value at the contact ending time, when the portion of the tread 31 of the tire 3 corresponding to the position of the acceleration acquisition device 10 is changed from a state contacting the ground to a state not contacting the ground with the rotation of the tire 3. Hereinafter, this peak value at the ending of contacting the ground where the output voltage of the acceleration acquisition device 10 has the maximum value is referred to as a second peak value.

The reason why the output voltage of the acceleration acquisition device 10 has a peak value at the timing is as follows. When the portion of the tread 31 corresponding to the position of the acceleration acquisition device 10 contacts the ground with the rotation of the tire 3, a portion of the tire 3, which had a substantially cylindrical surface, is pressed to be deformed into a flat shape in the vicinity of the acceleration acquisition device 10. Upon receiving the impact at this time, the output voltage of the acceleration acquisition device 10 has the first peak value. When the portion of the tread 31 corresponding to the position of the acceleration acquisition device 10 is separated from the ground with the rotation of the tire 3, the pressing of the portion of the tire 3 is released in the vicinity of the acceleration acquisition device 10, and the flat shape of the portion of the tire 3 returns to the substantially cylindrical shape. Upon receiving the impact when the shape of the tire 3 returns, the output voltage of the acceleration acquisition device 10 has the second peak value. The output voltage of the acceleration acquisition device 10 takes the first peak value and the second peak value at the ground-contact beginning time and the ground-contact ending time, respectively. Since a direction of impact when the tire 3 is pressed and a direction of impact when the tire 3 is released from pressurization are opposite, polarities of the output voltages are also opposite.

The portion of the tire tread 31, which corresponds to a location where the acceleration acquisition device 10 is disposed, at a moment of contacting the ground is referred to as a "stepping zone." The portion of the tire tread 31 at a moment of leaving the road surface is referred to as a "kick-out zone." The "stepping zone" includes a timing having the first peak value. The "kick-out zone" includes a timing having the second peak value. The zone prior to the stepping zone is referred to as a "pre-stepping zone." The zone from the stepping zone to the kick-out zone, in other words, the portion of the tire tread 31, which corresponds to the attachment location of the acceleration acquisition device 10, during ground-contacting is in a zone referred to as a "pre-kick out zone." The zone subsequent to the kick-out zone is referred to as a "post-kick out zone." A period, during which the portion of the tire tread 31 corresponding to the attachment location of the acceleration acquisition device 10 is in contact with the ground, and both ends of the period altogether can be divided into five zones. FIG. 4 illustrates that "pre-stepping zone," "stepping zone," "pre-kick out zone," "kick-out zone," and "post-kick out zone" of the detection signal are respectively indicated as five zones R1 to R5 in order.

The vibration generated in the tire 3 at each divided zone varies and the detection signal of the acceleration acquisition device 10 varies based on the road surface condition. When a frequency analysis of the detection signal of the acceleration acquisition device at each zone is executed, the condition of road surface on which the vehicle travels can be detected. For example, a shearing force decreases at the time of kicking-out in a situation of a slippery road surface condition such as a snowy road. Therefore, a bandwidth value selected from a 1 kHz to 4 kHz band decreases in the kick-out zone R4 and the post-kick out zone R5. Since a variety of frequency components of the detection signal in the acceleration acquisition device 10 vary according to the road surface condition, it is possible to determine the road surface condition based on the frequency analysis of the detection signal.

Figure 5:
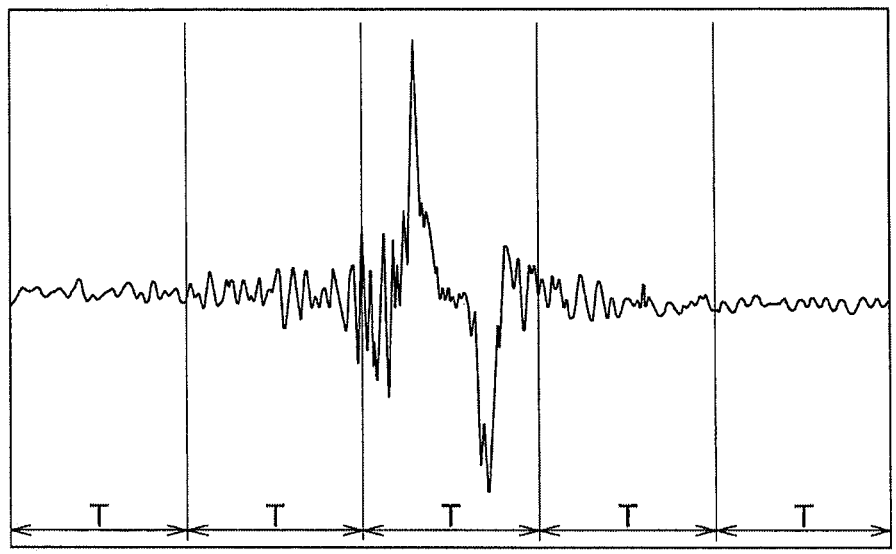
FIG. 5 is a diagram that illustrates a detection signal of the acceleration acquisition device partitioned by each of time windows, which has a predetermined time width T.

The feature quantity extraction device 11a divides the detection signal of the acceleration acquisition device 10 having a continuous-time waveform for one rotation of the tire 3 into plural sections. Each section has a time window with a predetermined time width T as shown in FIG. 5. The feature quantity extraction device 11a executes the frequency analysis at each section to extract the feature quantity. In particular, when the frequency analysis is executed at each section, a power spectral density level at each frequency band, in other words, a vibration level in a specified frequency band is evaluated. The power spectral density level represents the feature quantity.

The number of sections divided by the time window having a time width T is variable according to a vehicle speed, more specifically, a rotational speed of the tire 3. In the following description, "n" represents the number of sections for one rotation. "n" is a natural number.

For example, detection signals in the respective sections correspondingly pass through plural filters with specified frequency bandwidths to obtain power spectral density levels. The plural filters may be, for example, five bandpass filters having respective frequency bands 0 to 1 kHz, 1 kHz to 2 kHz, 2 kHz to 3 kHz, 3 kHz to 4 kHz, and 4 kHz to 5 kHz. The power spectral density level represents the feature quantity. The feature quantity is called a feature vector. When the power spectral density level in each specified frequency band is indicated as $a_{ik}$, the feature vector Xi in a section "i", where "i" is a natural number and is in a relation of $1 \le i \le n$, represents the following expression as a determinant having the power spectral density levels as elements.

$$x_i = \begin{bmatrix} a_{i1} \\ a_{i2} \\ a_{i3} \\ a_{i4} \\ a_{i5} \end{bmatrix} \qquad \text{[Expression 1]}$$

"k" in the power spectral density level $a_{ik}$ represents the number of specified frequency bands, in other words, the number of bandpass filters. In a situation where a 0 to 5 kHz band is divided into five sections, "k" is in a relation of k=1 to 5. The determinant X collectively showing the respective feature vectors X1 to Xn in all sections 1 to n is expressed as follows.

$$x = \begin{pmatrix} a_{11} & a_{21} & \cdots & a_{n1} \\ a_{12} & a_{22} & \cdots & a_{n2} \\ a_{13} & a_{23} & \cdots & a_{n3} \\ a_{14} & a_{24} & \cdots & a_{n4} \\ a_{15} & a_{25} & \cdots & a_{n5} \end{pmatrix} \qquad \text{[Expression 2]}$$

The determinant X is an expression that represents the feature quantity for one rotation of the tire. The feature quantity extraction device 11a extracts the feature quantity expressed in the determinant X by executing the frequency analysis of the detection signal of the acceleration acquisition device 10.

Next, the determination of a variation in the road surface condition through the variation determination device 11c will be described. The determination is executed by calculating a degree of similarity based on the present feature quantity extracted by the feature quantity extraction device 11a and the previous feature quantity stored in the feature quantity storage 11b.

With regard to the determinant X representing the feature quantity as described above, X(r) represents the determinant of the present feature quantity, and X(r−1) represents the determinant of the previous feature quantity. The respective expressions $a(r)_{ik}$, $a(r-1)_{ik}$ represent the power spectral density level $a_{ik}$ as an element of each determinant. In this situation, the determinant X(r) of the present feature quantity and the determinant X(r−1) of the previous feature quantity are respectively expressed as follows.

$$x(r) = \begin{pmatrix} a(r)_{11} & a(r)_{21} & \ldots & a(r)_{n1} \\ a(r)_{12} & a(r)_{22} & \ldots & a(r)_{n2} \\ a(r)_{13} & a(r)_{23} & \ldots & a(r)_{n3} \\ a(r)_{14} & a(r)_{24} & \ldots & a(r)_{n4} \\ a(r)_{15} & a(r)_{25} & \ldots & a(r)_{n5} \end{pmatrix}$$ [Expression 3]

$$x(r-1) = \begin{pmatrix} a(r-1)_{11} & a(r-1)_{21} & \ldots & a(r-1)_{n1} \\ a(r-1)_{12} & a(r-1)_{22} & \ldots & a(r-1)_{n2} \\ a(r-1)_{13} & a(r-1)_{23} & \ldots & a(r-1)_{n3} \\ a(r-1)_{14} & a(r-1)_{24} & \ldots & a(r-1)_{n4} \\ a(r-1)_{15} & a(r-1)_{25} & \ldots & a(r-1)_{n5} \end{pmatrix}$$ [Expression 4]

The degree of similarity indicates a degree of similarity between the feature quantities represented by two determinants. The two determinants are similar as the degree of similarity is higher. In the present embodiment, the variation determination device 11c evaluates the degree of similarity using the kernel method, and determines the variation in the road surface condition based on the degree of similarity. An inner product of the determinant X(r) at the time of the present rotation of the tire 3 and the determinant X(r−1) at the time of one rotation before the present rotation is calculated, and the inner product is used as the degree of similarity. In other words, the distance between coordinates indicated by the feature vector Xi in the sections divided by each time window having a predetermined time width T within a feature space is calculated, and the distance is used as the degree of similarity.

Figure 6:
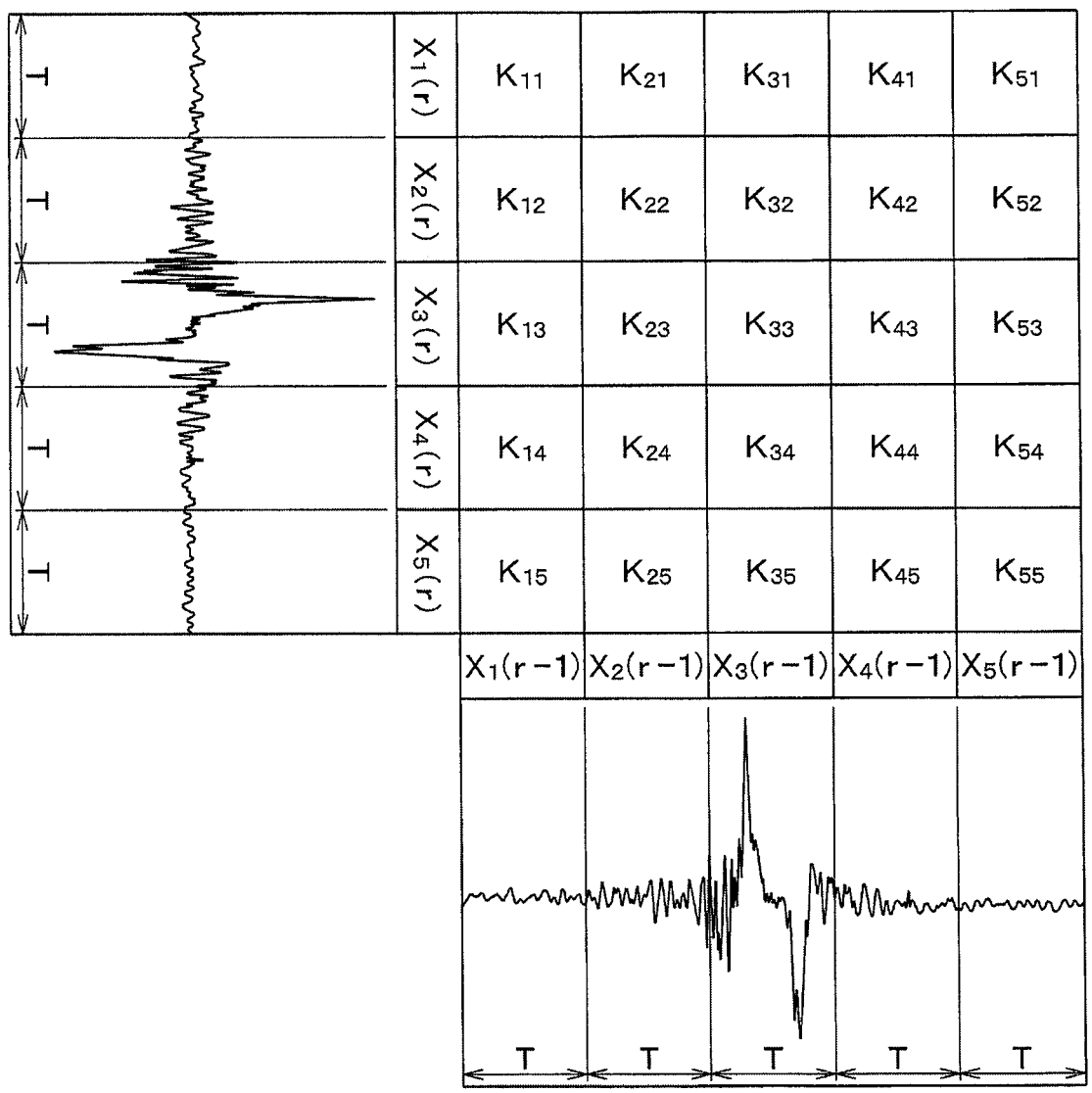
FIG. 6 shows a relationship among determinants $Xi(r)$, $Xi(r-1)$ and a distance $K_{yz}$ in each section, which is obtained by dividing a time-axis waveform at a time of the tire's present rotation and a time-axis waveform at a time of one rotation before the tire's present rotation with each of the time windows, which has the predetermined time width T.

For example, as shown in FIG. 6, with regard to the time-axis waveform of the detection signal in the acceleration acquisition device 10, the time-axis waveform at the present rotation of the tire 3 and the time-axis waveform at the time of one rotation before the present rotation are respectively divided into sections by the time window having a predetermined time width T. As shown in the drawing, since each of the time-axis waveforms is divided into five sections, "n" is in a relation of n=5 and "i" is expressed by a relation of 1≤i≤5. As shown in the drawing, Xi(r) represents the feature vector in each section at the present rotation, and Xi(r−1) represents the feature vector in each section at the time of one rotation before the present rotation. In this situation, with regard to the distance $K_{yz}$ between coordinates indicated by the feature vectors Xi in the sections, it is indicated that a horizontal tile including the feature vector Xi(r) in each section at the present rotation intersects with a vertical tile including the feature vector Xi(r−1) in each section at the time of one rotation before the present rotation. With regard to the distance $K_{yz}$, "y" is a value obtained by rewriting "i" in Xi(r−1), and "z" is a value obtained by rewriting "i" in Xi(r). Since the vehicle speed does not vary greatly between the time of the present rotation and the time of one rotation before the present rotation, the number of sections at each rotation is basically similar.

In the present embodiment, the feature vector is acquired by dividing into five specified frequency bands. The feature vector Xi in each section is expressed in a six-dimensional space combined with the time-axis. The distance between the coordinates indicated by the feature vectors Xi in the respective sections is the distance between coordinates in the six-dimensional space. The distance between coordinates indicated by the feature vectors in the respective sections decreases as the feature quantities are similar, and increases as the feature quantities are not similar. Thus, the degree of similarity increases as the distance decreases, and the degree of similarity decreases as the distance increases.

For example, in a situation where the sections 1 to n are obtained by time division, the distance $K_{yz}$ between the coordinates indicated by the feature vector in the section 1 is expressed as follows.

[Expression 5]
$$K_{yz} = \sqrt{[a(r)_{11} - a(r-1)_{11}]^2 + [a(r)_{12} - a(r-1)_{12}]^2 + \ldots [a(r)_{15} - a(r-1)_{15}]^2}$$

The distance $K_{yz}$ between the coordinates indicated by the feature vectors in the respective sections is evaluated for all sections, and then the sum of the distance $K_{yz}$ for all sections is calculated. The sum $K_{total}$ is used as a value corresponding to the degree of similarity. The sum $K_{total}$ is compared with a predetermined threshold value Th. When the sum $K_{total}$ is larger than the threshold value Th, the degree of similarity is smaller and it is determined that there is a variation in the road surface condition. When the sum $K_{total}$ is smaller than the threshold value Th, the degree of similarity is larger and it is determined that there is no variation in the road surface condition.

The sum $K_{total}$ of the distances $K_{yz}$ between two coordinates indicated by the feature vectors in the respective sections is used as a value corresponding to the degree of similarity. Other values may also be used as a parameter for indicating the degree of similarity. For example, the average distance $K_{ave}$, which is an average value of the distance $K_{yz}$ evaluated by dividing the sum $K_{total}$ through the number of sections, can be used as a parameter indicative of the degree of similarity. As shown in Patent Literature 1, the degree of similarity can also be evaluated by using a variety of kernel functions, and the degree of similarity can be calculated except for a path having a low degree of similarity.

Subsequently, an operation of the tire apparatus 100 according to the present embodiment is described with reference to FIG. 7.

Figure 7:
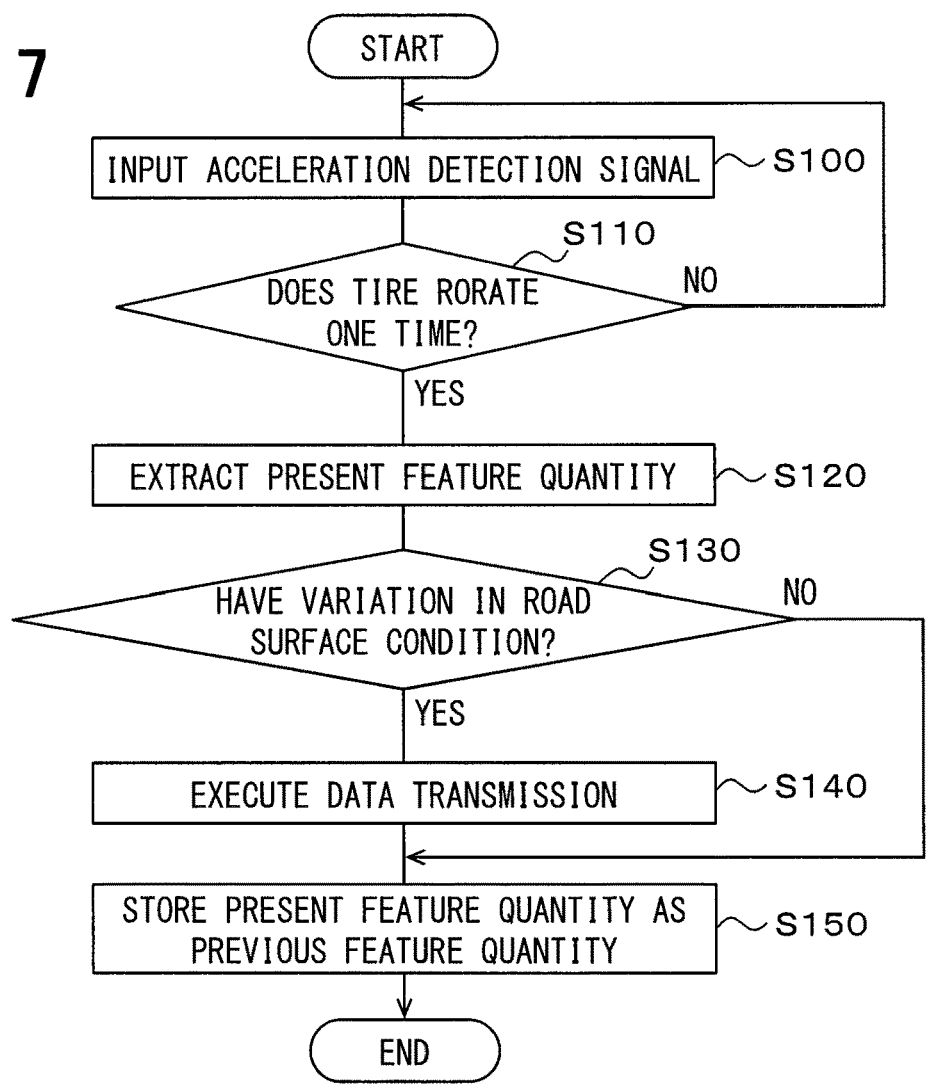
FIG. 7 is a flow chart showing a data transmission process executed by a controller in the tire-side device.

The controller 11 in the tire-side device 1 of each wheel executes a data transmission process shown in FIG. 7. The process is executed for each predetermined control cycle.

In S100, input processing for the detection signal in the acceleration acquisition device 10 is executed. The processing is continued for a period until the tire 3 performs one rotation in a subsequent S110. When the detection signal in the acceleration acquisition device 10 is input for one rotation of the tire, the process proceeds to a subsequent S120, and then the feature quantity of the time-axis waveform of the detection signal in the acceleration acquisition device 10 for one rotation of the tire is extracted. The processing from S100 to S120 is executed by the feature quantity extraction device 11a.

One rotation of the tire 3 is determined based on the time-axis waveform of the detection signal in the acceleration acquisition device 10. Since the detection signal depicts the time-axis waveform shown in FIG. 4, one rotation of the tire 3 can be interpreted by checking the first peak value and the second peak value of the detection signal.

The road surface condition particularly appears as a variation in the time-axis waveform of the detection signal between both ends of the period including "stepping zone," "pre-kick out zone," and "kick-out zone." Therefore, the data during this period may be input. It is not necessary to input all the data of the detection signal in the acceleration acquisition device 10 during one rotation of the tire. For example, with regard to "pre-stepping zone" and "post-kick out zone," the data in the vicinity of "pre-stepping zone" and "post-kick out zone" may be input if the data exists. Therefore, in a zone where the vibration level of the detection signal in the acceleration acquisition device 10 is smaller than a threshold value, the detection signal may not be input during the "pre-stepping zone" and "post-kick out zone" as these periods are hardly affected by the influence of road surface condition.

The extraction of the feature quantity at S120 is executed by the method described above.

Subsequently, the process proceeds to S130. The degree of similarity is evaluated by the method described above based on the present feature quantity and the previous feature quantity, and, for example, the degree of similarity is compared with the threshold value Th to determine whether there is a variation in the road surface condition. Since this processing is executed by the variation determination device 11c, this processing is executed based on the present feature quantity extracted by the feature quantity extraction device 11a and the previous feature quantity stored in the feature quantity storage 11b at S150.

In a situation where an affirmative determination is made in S130, the road surface data including the present feature quantity is transmitted from the transmission controller 11d to the data communication device 12 for executing the data transmission in S140. Therefore, the road surface data including the present feature quantity is transmitted through the data communication device 12. The road surface data including the present feature quantity is transmitted from the data communication device 12 only when there is a variation in the road surface condition. The data transmission is not executed when there is no variation in the road surface condition. Thus, it is possible to reduce communication frequency, and it is possible to achieve in saving power consumption of the controller 11 in the tire 3.

Finally, the process proceeds to S150. The present feature quantity is stored in the feature quantity storage 11b as the previous feature quantity, and then the process ends.

Figure 8:
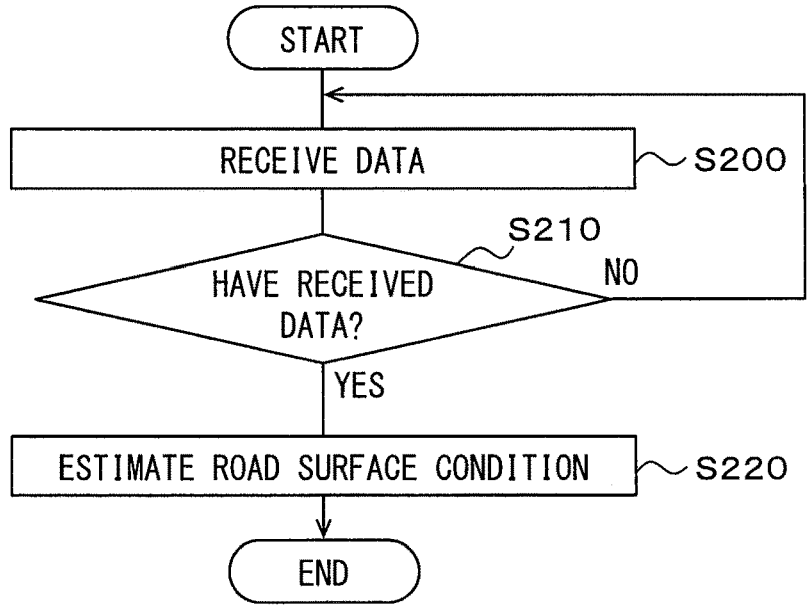
FIG. 8 is a flowchart showing a road surface condition estimation process executed by a controller in a vehicle body side system.

On the other hand, the controller 25 of the receiver 21 executes a road surface estimation process shown in FIG. 8. The process is executed for each predetermined control cycle.

First, in S200, data reception processing is executed. The processing is executed by the controller 25 retrieving the road surface data, when the data communication device 24 receives the road surface. When the data communication device 24 does not execute data reception, the controller 25 ends the processing without retrieving any of the road surface data.

Subsequently, the process proceeds to S210, and determines whether there is data reception. In a situation where there is data reception, the process proceeds to S220. In a situation where there is no data reception, processing at S200, S210 is repeated until data reception occurs.

The process proceeds to S220, and the estimation of road surface condition is executed. With regard to the estimation of road surface condition, the road surface condition is estimated by comparing the present feature quantity included in the received road surface data with a support vector for classifying the road surface stored in the support vector storage 25a. For example, the degree of similarity between the present feature quantity and all of the support vectors for classifying the road surface is evaluated. The road surface corresponding to the support vector with the highest degree of similarity is estimated as the present travelling road surface. For the calculation of the degree of similarity at this situation, the similar method for calculating the present feature quantity and the previous feature quantity in S130 of FIG. 7 may be applied.

As described above, it is possible to estimate the condition of road surface on which the vehicle travels with the tire apparatus 100 according to the present embodiment. When estimating such a road surface condition, transmission of road surface data including the present feature quantity from the tire-side device 1 is executed only at a timing of having a variation in the road surface condition. Therefore, it is possible to decrease communication frequency, and it is possible to achieve in saving power consumption of the controller 11 in the tire 3.

Since the tire apparatus 100 does not require to include the support vector storage for storing the support vector in the controller 11 of the tire-side device 1, it is possible to save memory of the controller 11 in the tire 3.

With regard to data processing of calculating the degree of similarity through the controller 11 of the tire-side device 1, the data processing may be only executed on the present feature quantity and the previous feature quantity. With regard to calculating the degree of similarity between the present feature quantity and all support vectors, it may be executed at the vehicle body side system 2. Therefore, it is possible to further suppress the amount consumed in the memory of the controller 11 in the tire 3 so that saving memory consumption can be achieved.

It is possible to provide the tire-side device 1 achieving in saving memory and power consumption of the controller 11 in the tire 3, and the tire apparatus 100 including the tire-side device 1.

Other Embodiments

Although the present disclosure has been described in accordance with the embodiments described above, the present disclosure is not limited to the embodiments described above, and encompasses various modifications and variations within the scope of equivalents. In addition, various combinations and modes, and other combinations and modes including only a single element, or more or less elements, are all included in the scope and the range of spirit of the present disclosure.

For example, the feature quantity storage 11b stores the feature quantity one rotation before the present rotation as the feature quantity at the time of a past rotation of the tire 3; however, it is not necessary to have only the feature quantity at one rotation before the present rotation. The feature quantity storage 11b is not limited to store the previous feature quantity as the feature quantity at the past rotation of the tire 3 (hereinafter referred to as a "past feature quantity"). Plural feature quantities in the respective plural rotations before the present rotation may be stored as the past feature quantity, and an average value of the plural feature quantities including the previous feature quantity may also be stored as the past feature quantity. About the calculation of the degree of similarity with the previous feature quantity, the previous feature quantity of the past feature quantities may be used, and the average value of the past feature quantities including the previous feature quantity may also be used. In consideration of saving memory, it may be preferable to save a least number of feature quantities.

Although the above embodiment shows that the vibration detector is configured by the acceleration acquisition device 10, the vibration detector may also be configured by any other vibration detector, for example, a piezoelectric element.

When there is a variation in the road surface condition, the road surface data including the present feature quantity is transmitted from the tire-side device 1. However, the previous feature quantity may be included in the road surface data. In this situation, the vehicle body side system 2 can also estimate the road surface condition before variation by comparing the previous feature quantity with the support vector. Therefore, it is possible to estimate the road surface condition before and after variation and recognize a variation in the road surface condition more accurately.

In the above embodiment, the controller 25 of the receiver 21 in the vehicle body side system 2 evaluates the degree of similarity between the present feature quantity and the support vector, executes the estimation of the road surface condition. However, this case is only an example. Other ECUs, for example, a controller in the brake ECU 22 may determine the degree of similarity and estimate the road surface condition.

What is claimed is:

1. A tire-side device attached to a tire included in a vehicle and applied to a tire apparatus for estimating a condition of a road surface on which the vehicle travels, the tire-side device comprising:
an acceleration sensor configured to output a detection signal according to a level of vibration of the tire;
a controller including a processor and a memory that stores instructions, configured to, when executed by the processor, cause the processor to extract a past feature quantity of the detection signal corresponding to a past rotation of the tire, to store the past feature quantity, and to further extract a present feature quantity corresponding to a present rotation of the tire; and
a data communication device configured to transmit road surface data including the present feature quantity extracted by the controller,
wherein the past rotation of the tire is only one rotation of the tire immediately before the present rotation of the tire, and the present rotation of the tire is one rotation of the tire in the present, and
wherein the instructions are configured to, when executed by the processor, further cause the processor to:
calculate a degree of similarity between the present feature quantity and the past feature quantity;
determine whether or not a variation occurs in the condition of the road surface between the past rotation and the present rotation of the tire, based on a comparison result between the degree of similarity and a predetermined threshold value; and
control transmission of the road surface data and cause the data communication device to transmit the road surface data including the present feature quantity in response to the controller determining that the variation occurs in the condition of the road surface between the past rotation and the present rotation of the tire based on the degree of similarity being smaller than the predetermined threshold value, and to not transmit the road surface data in response to determining that the variation does not occur in the condition of the road surface between the past rotation and the present rotation of the tire based on the degree of similarity being larger than the predetermined threshold value.

2. The tire-side device according to claim 1, wherein each of the past feature quantity and the present feature quantity extracted by the controller is expressed by a feature vector having a time-axis waveform of the detection signal.

3. A tire apparatus comprising:
the tire-side device according to claim 1, wherein the controller is configured as a first controller and the data communication device is configured as a first data communication device; and
a vehicle body side system including:
a second data communication device configured to receive the road surface data including the present feature quantity transmitted from the first data communication device; and
a second controller including a second processor and a second memory that stores instructions, configured to, when executed by the second processor, cause the second processor to:
estimate the condition of the road surface based on the road surface data received by the second data communication device;
store a support vector of each of the past feature quantity and the present feature quantity for each type of the condition of the road surface; and
estimate the condition of the road surface based on the present feature quantity included in the road surface data and the support vector stored in the first controller.

4. The tire-side device according to claim 1, wherein the instructions are further configured to, when executed by the processor, further cause the processor to:
update the past feature quantity with the present feature quantity to store the past feature quantity updated with the present feature quantity, after determining whether or not the variation occurs in the condition of the road surface between the past rotation and the present rotation of the tire.

5. A tire-side device comprising:
an acceleration sensor configured to output a detection signal according to a level of vibration of a tire included in a vehicle;
a controller including a processor and a memory that stores instructions, configured to, when executed by the processor, cause the processor to extract a past feature quantity of the detection signal corresponding to a past rotation of the tire, to store the past feature quantity, and to further extract a present feature quantity corresponding to a present rotation of the tire; and a data communication device configured to transmit road surface data including the present feature quantity extracted by the controller, wherein the past rotation of the tire is only one rotation of the tire immediately before the present rotation of the tire, and the present rotation of the tire is one rotation of the tire in the present, and wherein the instructions are configured to, when executed by the processor, further cause the processor to:
calculate a degree of similarity between the present feature quantity and the past feature quantity;
determine whether or not a variation occurs in the condition of the road surface between the past rotation and the present rotation of the tire, based on a comparison result between the degree of similarity and a predetermined threshold value; and
control transmission of the road surface data and cause the data communication device to transmit the road surface data including the present feature quantity in response to the controller determining that the variation occurs in the condition of the road surface between the past rotation and the present rotation of the tire based on the degree of similarity being smaller than the predetermined threshold value, and to not transmit the road surface data in response to determining that the variation does not occur in the condition of the road surface between the past rotation and the present rotation of the tire based on the degree of similarity being larger than the predetermined threshold value.

* * * * *